United States Patent [19]
Knight et al.

[11] Patent Number: 5,867,347
[45] Date of Patent: Feb. 2, 1999

[54] HEAD SUSPENSION WITH STACKED COIL MICROACTUATOR FOR TRACKING AXIS ADJUSTMENT OF A READ/WRITE HEAD

[75] Inventors: Steven J. Knight, Hutchinson; Mark T. Girard, South Haven, both of Minn.

[73] Assignee: Hutchinson Technology Incorporated, Hutchinson, Minn.

[21] Appl. No.: 874,137

[22] Filed: Jun. 13, 1997

[51] Int. Cl.$^6$ .................................................. G11B 5/48
[52] U.S. Cl. ............................................................ 360/104
[58] Field of Search ..................................... 360/106, 104

[56] References Cited

U.S. PATENT DOCUMENTS

| | | | |
|---|---|---|---|
| 4,814,908 | 3/1989 | Schmitz | 360/77.02 |
| 4,858,040 | 8/1989 | Hazebrouck | 360/78.05 |
| 5,189,578 | 2/1993 | Mori et al. | 360/106 |
| 5,216,559 | 6/1993 | Springer | 360/106 |
| 5,303,105 | 4/1994 | Jorgenson | 360/106 |
| 5,359,474 | 10/1994 | Riederer | 360/78.05 |
| 5,367,420 | 11/1994 | Yagi et al. | 360/109 |
| 5,400,192 | 3/1995 | Mizoshita et al. | 360/77.16 |
| 5,408,376 | 4/1995 | Nishikura et al. | 360/109 |
| 5,438,469 | 8/1995 | Rudi | 360/109 |
| 5,521,778 | 5/1996 | Boutaghou | 360/106 |
| 5,535,074 | 7/1996 | Leung | 360/104 |
| 5,539,596 | 7/1996 | Fontana et al. | 360/106 |
| 5,657,188 | 8/1997 | Jurgenson et al. | 360/106 |

FOREIGN PATENT DOCUMENTS

| | | |
|---|---|---|
| 0 549 814 A1 | 7/1993 | European Pat. Off. . |
| 59-203272 | 11/1984 | Japan . |
| 63-291271 | 11/1988 | Japan . |
| 2-227886 | 11/1990 | Japan . |
| 3-69072 | 3/1991 | Japan . |
| 59-96571 | 6/1994 | Japan . |
| 7201148 | 8/1995 | Japan . |
| WO 93/02451 | 2/1993 | WIPO . |

OTHER PUBLICATIONS

Miu, "Microactuators for Rigid Disk Drives", published in Jul./Aug. 1995 issue of DATA STORAGE magazine and in Jan. 1996 issue of Japanese Journal of Applied Physic, pp. 1–14.

Senturia, "The future of microsensor and microactuator design", Elsevier Science, S.A. 1996, pp. 125–127.

Fujita, "Future of actuators and microsystems", Elsevier Science S.A. 1996, pp. 105–111.

Brysek, "Impact of MEMS technology on society", Elsevier Science S.A. 1996, pp.1–9.

Miu, "Silicon Microstructures and Microactuators for Compact Computer Disk Drives", http://www.computer.org/conferen/mss95/miu/miu.htm web site pp. 1–13, Nov. 18, 1995.

Koganezawa, et al., "A Flexural Piggyback Milli–Actuator for Over 5 Gbit/in Density Magnetic Recording", IEEE, Transactions on Magnetics, vol. 32 No. 5, Sep. 1996 pp. 3908–3910.

(List continued on next page.)

*Primary Examiner*—A. J. Heinz
*Attorney, Agent, or Firm*—Faegre & Benson LLP

[57] ABSTRACT

A disk drive suspension for mounting to the end of an actuator arm. The suspension includes a load beam having a rigid region, a proximal end, a flexure for receiving and supporting a read/write head on a distal end of the load beam, and a linkage for movably coupling the flexure to the proximal end of the load beam. A microactuator is located on the load beam and includes spaced first and second coil assemblies which undergo displacement perpendicular to the plane of the load beam in response to tracking control signals. The linkage translates the vertical displacement of the coil assemblies into displacement of the distal end of the load beam including the flexure along a transverse tracking axis.

35 Claims, 16 Drawing Sheets

OTHER PUBLICATIONS

Wu, et al, Silicon Micromachined Integrated Suspension Systems for 30% Read/Write Pico–Sliders,: submitted for publication in the ASME Journal of Vibration & Acoustics, pp. 1–13, undated.

O'Connor, Microengines go for a Spin,: Mechanical Engineering, Feb. 1995, p. 66.

O'Connor, "Miniature motors for future PCs," Mechanical Engineering, Feb. 1995, pp. 63–65.

Miu, et al., "Silicon Micromachined SCALED Technology", 1993 JSME International Conference on Advance Mechatronics, Tokyo, Japan, Aug. 1993, pp. 527–532.

Mori, et al., A Dual–Stage Magnetic Disk Drive Actuator Using A Piezoelectric Device for a High Track Density,: IEEE Transactions on Magnetics, Nov. 1991, vol. 27, No. 6, pp. 5298–5300.

Miu, et al. "Silicon Microstructures and Microactuators for Compact Computer Disk Drives," IEEE Control Systems, Dec. 1994, pp. 52–57.

Microactuator–related materials published at a National Storage Industry Consortium meeting, 18 pages.

Wu, et al, "Silicon micromachined integrated suspension systems for magnetic disk drives", Elsevier Science S.A., 1996, pp. 195–200.

Knight et al., "Design and Testing of Suspension With Integrated Magnetic Microactuator", presented Jul. 1996 at IBM Almaden Research Center, pp. 1–7.

Tang, et al., "Silicon Micromachined Electromagnetic Microactuators For Rigid Disk Drives," submitted for presentation at the INTERMAG Conference, Apr. 1995, 2 pages.

Tang et al., "Design, Fabrication and Testing of Micromachined Electromagnetic Microactuators for Rigid Disk Drives," submitted for presentation at the Transducer '95 Conference, Apr. 1995, 2 pages.

Temesvary, et al., Design, Fabrication and Testing of Silicon Microgimbals for Super–Compact Rigid Disk Drives, IEEE/ASME J. of MEMS, Dec. 1994, pp. 1–26.

Miu, et al., "Silicon Microgimbals for Super–Compact Magnetic Recording Rigid Disk Drives," Adv. Info. Storage Syst., vol. 5, 1993, pp. 139–152.

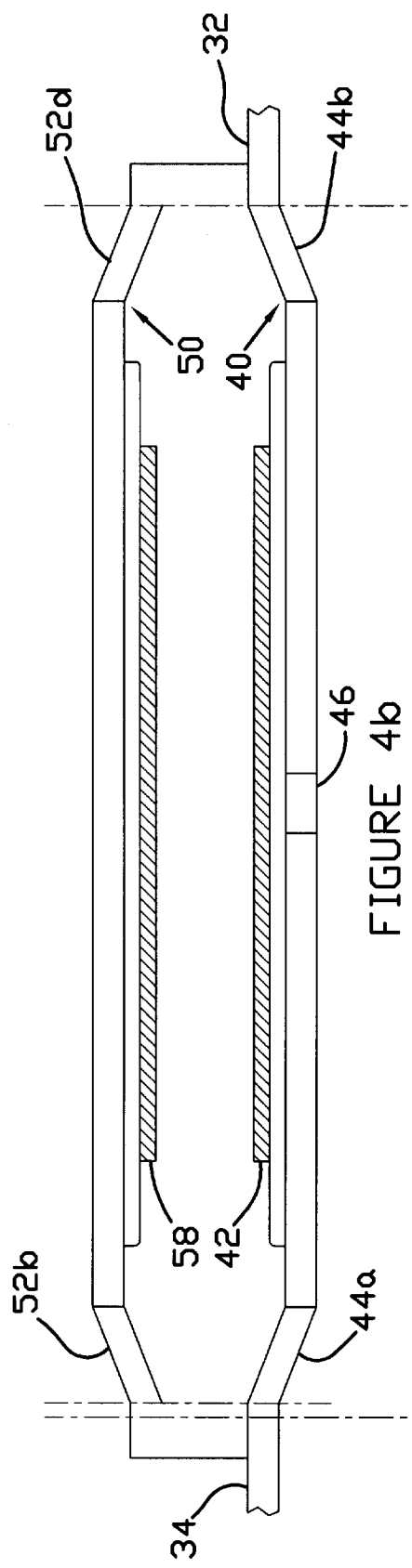
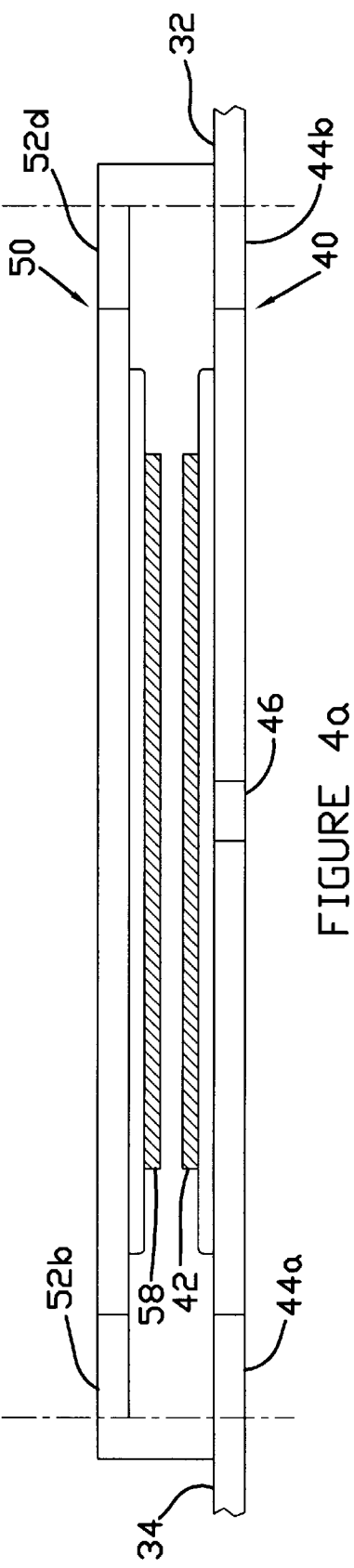

HEAD SUSPENSION WITH STACKED COIL MICROACTUATOR FOR TRACKING AXIS ADJUSTMENT OF A READ/WRITE HEAD

BACKGROUND OF THE INVENTION

1. Field of the Invention

The present invention relates generally to suspensions for supporting read/write heads over recording media. In particular, the present invention is a head suspension assembly with a stacked coil tracking microactuator.

2. Description of the Related Art

Disk drives include suspensions for supporting read/write heads over information tracks of rotating disks. The well known and widely used Watrous-type suspensions include a load beam having a baseplate on a proximal end, a flexure on a distal end, a relatively rigid region adjacent to the flexure and a spring region between the baseplate and rigid region. An air-bearing slider which includes the read/write head is mounted to the flexure. The baseplate of the suspension is mounted to an actuator arm. A motor which is controlled by a servo control system rotates the actuator arm to position the read/write head over desired information tracks on the disk. This type of suspension is used with both magnetic or non-magnetic disks.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired servo track.

The use of suspensions having microactuators or fine tracking motors has been proposed to overcome these problems. One such suspension is disclosed in U.S. patent application Ser. No. 08/457,432 filed Jun. 6, 1995 (U.S. Pat. No. 5,657,188) by Jurgenson et al. entitled Head Suspension with Tracking Microactuator which is assigned to Hutchinson Technology Incorporated, the assignee of the present application.

There is, however, a continuing need for improved microactuators. In particular, the microactuator must be capable of quickly and accurately positioning the read/write head. The microactuator should also be lightweight to minimize detrimental effects on the resonance characteristics of the suspension, and relatively thin to enable close disk-to-disk spacing. It is also advantageous for the microactuator to operate off of relatively low voltage signals that do not interfere with read/write operations. To be commercially viable the microactuator must also be reliable and capable of being efficiently manufactured.

SUMMARY OF THE INVENTION

The present invention is a suspension which includes a lightweight, low-profile and efficient-to-manufacture tracking microactuator. One embodiment of the suspension includes a load beam having a proximal end, a distal end, and a rigid region therebetween. A flexure is located at the distal end of the load beam for receiving and supporting a read/write head. A microactuator is located on the load beam and has first and second vertically spaced actuator members such that at least the first actuator member undergoes displacement in response to tracking control signals. A linkage is located in the rigid region of the load beam adjacent to the microactuator for translating the displacement of at least the first actuator member to displacement of the distal end of the load beam, including the flexure, along a transverse tracking axis with respect to the proximal end.

BRIEF DESCRIPTION OF THE DRAWINGS

FIG. 4a is a schematic side view of the microactuator coils shown in FIG. 1 in an unactuated state.

FIG. 4b is a schematic side view of the microactuator coils shown in FIG. 1 in an actuated state.

DETAILED DESCRIPTION OF THE PREFERRED EMBODIMENTS

Figure 1:
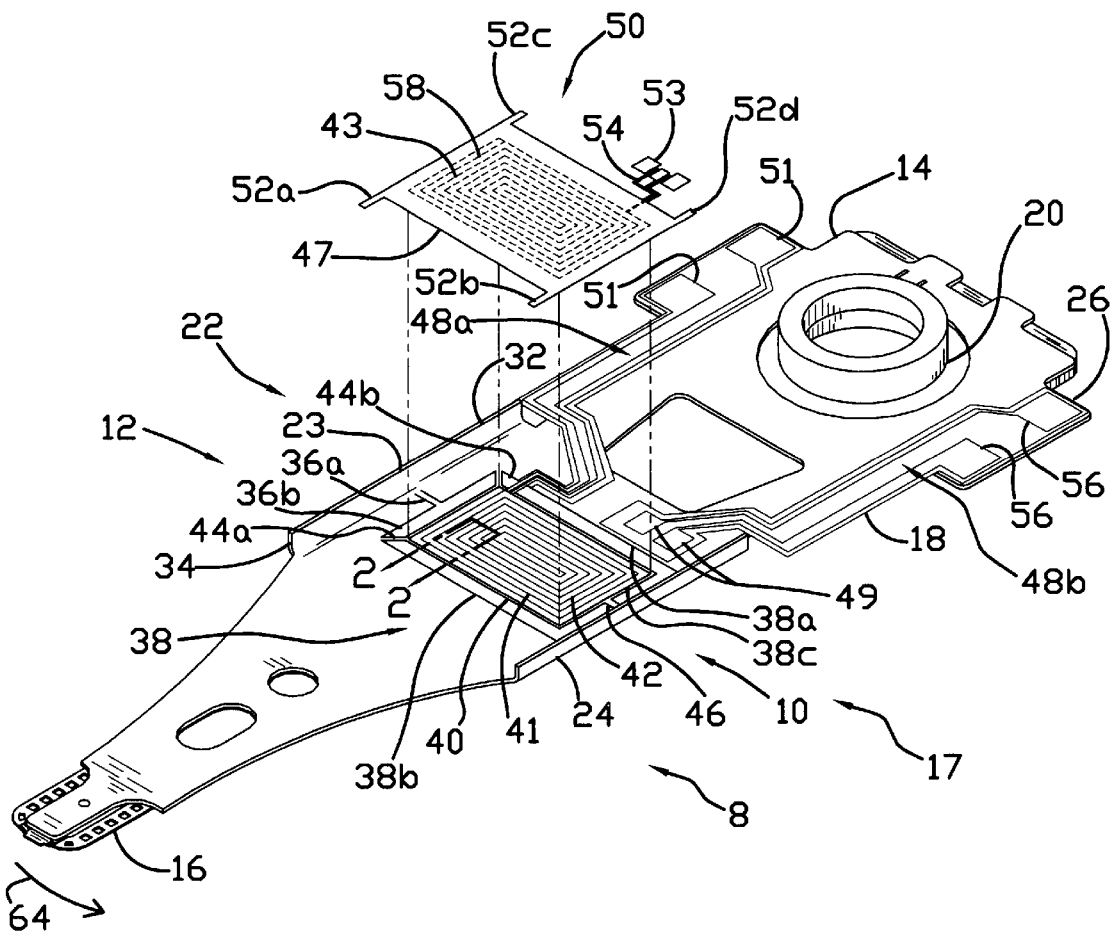
FIG. 1 is an exploded isometric view of a head suspension including a stacked coil microactuator in accordance with a first embodiment of the present invention.

A head suspension 8 which includes a stacked coil microactuator 10 in accordance with the present invention is illustrated generally in FIG. 1. As shown, suspension 8 includes a load beam 12 having a mounting region or base 14 on a proximal end, a flexure 16 on a distal end, a relatively rigid region 17 adjacent to the flexure, and a radius or spring region 18 between the base 14 and rigid region 17. A baseplate 20 is welded to base 14 for mounting the suspension 8 to a disk drive actuator arm (not shown). First and second edge rails 23 and 24 are formed in transversely opposite sides of the rigid region 17 of load beam 12. Tabs 26 which extend from base 14 are used to position and support read/write head lead wires (not shown), microactuator electrical leads 48a and 48b, and electrical contacts 51 and 56.

A spring connection is provided between a head slider (not shown) and the distal end of the load beam 12 by a flexure 16 which permits the head slider to move in pitch and roll directions so that it can compensate for fluctuations of a spinning disk surface above which the slider "flies." Many different types of flexures, also known as gimbals, are known to provide the spring connection allowing for pitch and roll movement of the head slider and can be used with the present invention.

The rigid region 17 of the load beam 12 includes proximal section 32 and a distal section 34 which are connected by a mechanical tracking linkage 22 including first and second edge rails 23 and 24. A transverse gap 36a extends between the proximal section 32 and the distal section 34 from a point adjacent to the first edge rail 23 into the rigid region 17. An open region 38 extends across rigid region 17 transversely between gap 36a and rail 24 and longitudinally between proximal section 32 and distal section 34.

Figure 2:
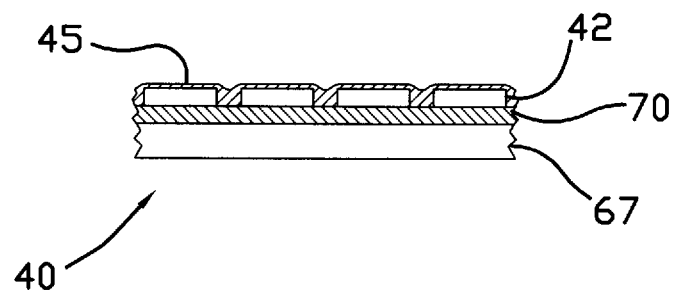
FIG. 2 is a sectional view of the head suspension shown in FIG. 1 taken along line 2—2.

Microactuator 10 includes first and second actuator members which can be driven or moved with respect to one another in response to tracking control signals. In the embodiment shown in FIG. 1, the first actuator member includes lower conducting coil assembly 40. Lower coil assembly 40 is located in open region 38 such that gap 38a extends transversely between coil assembly 40 and the proximal section 32, gap 38b extends transversely between coil assembly 40 and the distal section 34, 38c and extends longitudinally between coil assembly 40 and edge rail 24. A detailed cross section of lower coil assembly 40 taken along section line 2—2 of FIG. 1 is shown in FIG. 2. Coil assembly 40 includes of a base 67 formed of the same material as the load beam 12, e.g. stainless steel; a dielectric layer 70 formed of polyimide or other dielectric; and a lower magnetic field generating coil 41 having conducting coil leads 42 formed of Cu, BeCu, or other conducting material. In the embodiment shown in FIG. 2, the lower coil assembly 40 also includes a polyimide protective layer 45 overlaying leads 42.

In addition to first edge rail 23 and second edge rail 24, the linkage 22 also includes resilient diagonal arms 44a and 44b, resilient transverse arm 46, and gap 36a. Gap 36a extends transversely from rail 23 to gap 36b between the proximal section 32 and distal section 34. Diagonal arm 44a separates gap 36b from gap 38b and connects the coil assembly 40 to the distal section 34. Diagonal arm 44b separates gap 36b from gap 38a and connects coil assembly 40 to the proximal section 32. Transverse arm 46 passes across a midpoint of gap 38c and connects coil assembly 40 to edge rail 24. Arms 44a, 44b and 46 are all fabricated from stainless steel and formed from the same piece of material as load beam 12 in the embodiment shown. Microactuator electrical leads 48a extend from coil assembly 40 across the spring region 18 to base tabs 26 and electrically connect the conducting coil leads 42 of coil assembly 40 to electrical contacts 51 for connection to a tracking servo control (not shown) to allow the lower conducting coil assembly 40 to be responsive to tracking control signals.

The second member of microactuator 10 shown in FIG. 1 includes an upper conducting coil assembly 50 (shown in FIG. 1 exploded vertically away from the load beam 12) positioned vertically adjacent to lower coil assembly 40. In the embodiment of FIG. 1, the construction of upper coil assembly 50 is analogous to that of lower coil assembly 40 described above and includes a coil base 47 manufactured of stainless steel, an intermediate dielectric layer (not shown), and a magnetic field generating coil 43 having conducting leads 58. Although described herein as two coil assemblies, it is within the ambit of the present invention for the actuator members to be other structures that will vertically displace either towards or away from one another in response to tracking control signals. For example, the first and second actuator members can include piezo-electric elements, or, the first actuator member can include lower coil assembly 40 as described above, and the second actuator member can include a ferrous material or permanent magnet that would displace in response to a magnetic field generated by lower coil assembly 40.

In conjunction with upper coil assembly 50, linkage 22 includes resilient longitudinal arms 52a, 52b, 52c, and 52d, which can be formed from the same piece of material as base 47. Arms 52a and 52b connect upper coil assembly 50 to the distal section 34 of the rigid region 17. Arms 52c and 52d connect upper coil assembly 50 to the proximal section 32 of the rigid region 17. Electrical leads 54 couple conducting coil leads 58 to electrical contacts 56, through contacts 53 and 49, for connection to a tracking servo control (not shown) to allow upper coil assembly 50 to be responsive to tracking control signals. In another embodiment (not shown), upper coil assembly 50 and lower coil assembly 40 can be electrically connected to each other to allow both coil assemblies to be responsive to the same tracking control signal. It should be noted that, although in the embodiment of FIG. 1 both lower coil assembly 40 and upper coil assembly 50 are rectangular in shape, forming lower and upper coil assemblies 40 and 50, respectively, in other shapes is within the ambit of the present invention.

Figure 3:
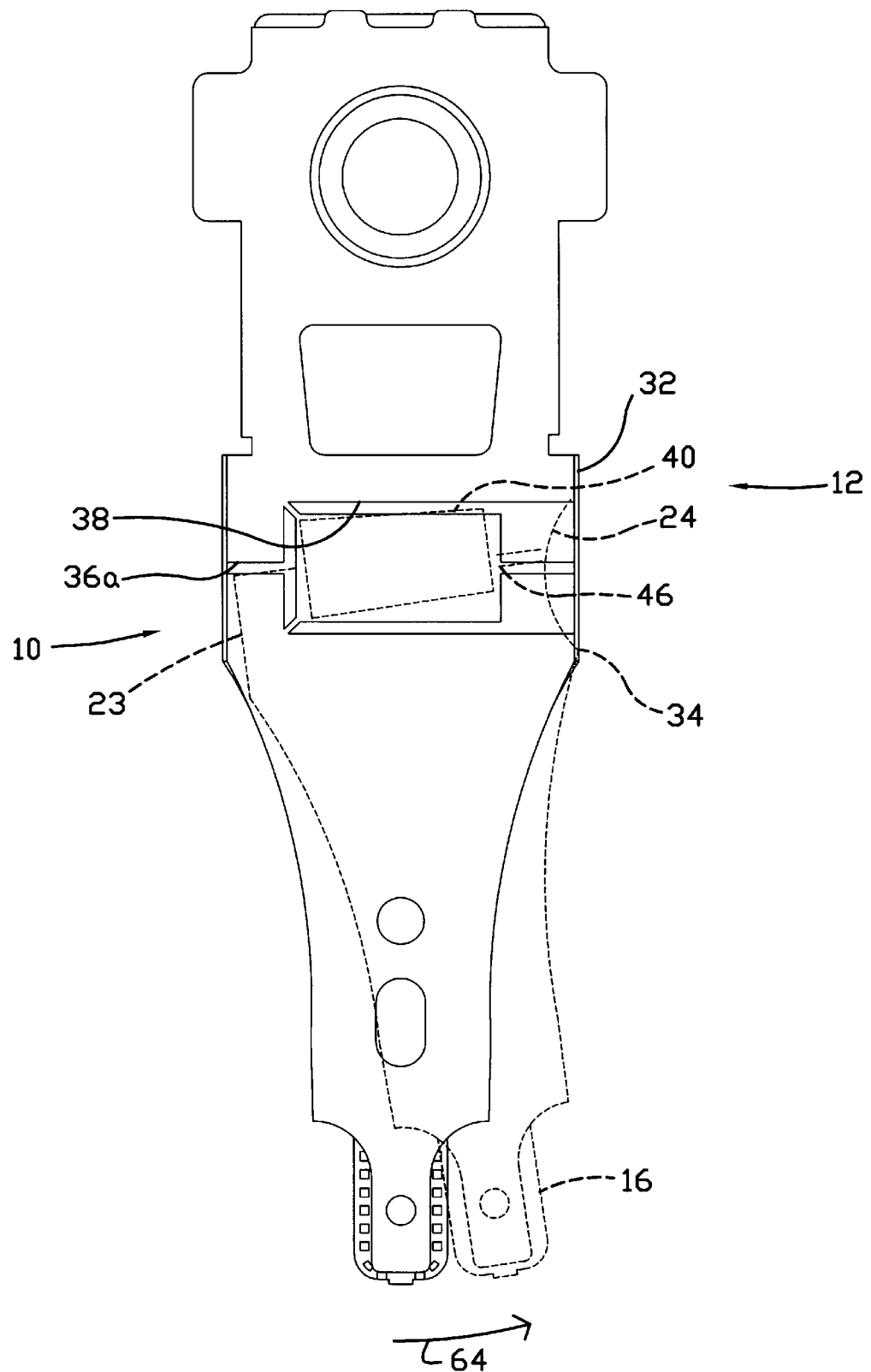
FIG. 3 is a schematic top view of the head suspension shown in FIG. 1 with the microactuator and load beam shown in an actuated position in phantom.

In the embodiment shown in FIG. 1, upper and lower coil assemblies 50 and 40, respectively, generate repelling forces and vertically displace away from one another when they become energized in response to tracking control signals. Linkage 22 converts this vertical displacement into transverse displacement along tracking axis 64. This motion is shown in phantom in FIG. 3 (to an exaggerated extent for purposes of illustration). Second edge rail 24 and transverse arm 46 are resilient so that as lower coil assembly 40 displaces downward, arm 46 elastically deforms edge rail 24 into gap 38c. This deformation pulls the distal section 34 of the rigid region 17 longitudinally towards the proximal section 32. First edge rail 23 is elastically bendable such that as the distal section 34 moves towards the proximal section, edge rail 23 bends at the point it intersects with gap 36a, tending to close gap 36a, such that the distal section 34 pivots with respect to the proximal section 32 about the bend point in edge rail 23. This pivoting action causes the distal section 34 of the rigid region 17 and the flexure 16 including the read/write head (not shown) to move along a transverse tracking axis 64. Flexure 16 and microactuator 10 are positioned on the load beam 12 in such a manner that the motion along tracking axis 64 is generally perpendicular to the information tracks on the magnetic disk (not shown). This direction is also generally perpendicular to both the longitudinal axis of the load beam 12 and the vertical displacement of the lower and upper coil assemblies 40 and 50, respectively.

Referring again to FIG. 1, motion of the flexure along the transverse tracking axis 64 is also facilitated by the upward vertical displacement of upper coil assembly 50. Either upper coil assembly 50, longitudinal arms 52a, 52b, 52c, and 52d, or both the arms and coil assembly 50 can be resilient. Thus, upward displacement of the upper coil assembly 50 causes the longitudinal distance between, respectively, arms 52b, 52d and arms 52c, 52a to decrease. Because arms 52a and 52b are connected to the distal section 34 and arms 52c, 52d are connected to the proximal section 32, this decrease in longitudinal distance tends to displace the distal section 34 longitudinally towards the proximal section 32. As this occurs, edge rail 24 elastically deforms into gap 38c allowing the distal section 34 to pivot with respect to the proximal section 32 about a bend point in edge rail 23 where rail 23 intersects with the gap 36a. The resilient nature of first and second edge rails 23 and 24, lower and upper coil assemblies 40 and 50, respectively, and arms 44a, 44b, 46, 52a, 52b, 52c, and 52d urge or bias flexure 16 back to its neutral position when lower and upper coil assemblies 40 and 50, respectively, are not energized.

Accordingly, microactuator 10 functions as a fine tracking actuator. In response to tracking control signals, microactuator 10 drives and positions flexure 16, and therefore the slider (not shown) and read/write head (not shown) mounted thereto, with respect to individual information tracks on the disk. The magnitude of the tracking control signals are governed by a servo control system to guide the extent of motion of the flexure 16 from its neutral position.

The mechanism by which the vertical displacement of lower and upper coil assemblies 40 and 50, respectively, cause the linkage 22 to pivotally displace distal section 34 longitudinally towards proximal section 32 is shown schematically in FIGS. 4a and 4b. FIG. 4a is a side view of the lower and upper coil assemblies 40 and 50, respectively, vertically adjacent to one another in an "unactuated" position. FIG. 4b shows the lower and upper coil assemblies 40 and 50, respectively, in an "actuated" position. Because the proximal section 32 of the rigid region is fixed to the base 14 of the load beam 12 and ultimately to an actuator arm (not shown), the proximal section 32, which is attached via linkage 22 to lower and upper coil assemblies 40 and 50, respectively, remains stationary in response to the vertical displacement of the lower and upper coil assemblies 40 and 50, respectively. Longitudinally extending arms 52b and 52d, and diagonally extending arms 44a and 44b, however, translate the vertical displacement of the lower and upper coil assemblies 40 and 50, respectively, into displacement in the plane of the load beam of the distal section 34 towards the proximal section 32. Because the flexure is connected to the distal section this movement translates the flexure 16 along the tracking axis 64 a distance from 0.1 micrometers to 5 micrometers in one embodiment.

The mechanism by which lower and upper coil assemblies 40 and 50, respectively, are vertically displaced away from one another in response to tracking control signals can be described with reference to FIGS. 1 and 5. Current is passed through coil leads 58 and 42 of lower and upper coil assemblies 40 and 50, respectively,. In the embodiment shown in FIG. 1, electrical contacts 51 and electrical leads 48a carry current generated by a tracking servo control (not shown) through the electrical coil leads 42 of lower coil assembly 40. Electrical contact 56 and electrical leads 54 carry current, also generated by the tracking servo control, through the coil leads 58 of upper coil assembly 50. Lower electrical contacts 49 are soldered or otherwise electrically attached by any method known in the art to upper electrical contacts 53 to close the connection between leads 54 and contacts 56. Other placements of contacts 51, 56, 53, and 49 and leads 48a, 48b and 54 are also within the ambit of the present invention.

Figure 5:
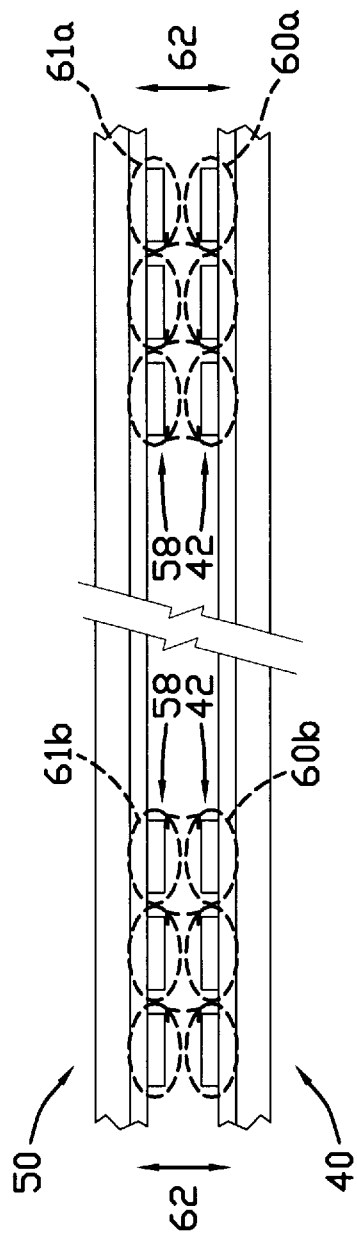
FIG. 5 is a detailed side view of the microactuator coils of FIG. 1 showing the electrical leads.

Lower and upper coil assemblies 40 and 50, respectively, are positioned vertically adjacent to each other such that the lower and upper coil leads 42 and 58, respectively, are positioned relative to each other as shown in FIG. 5, which shows a side view of a partial cross section of lower and upper coil assemblies 40 and 50, respectively, vertically adjacent to one another in an unactuated position. The lower coil leads 42 on the right side of FIG. 5 carry a current perpendicularly out of the plane of FIG. 5. The upper coil leads 58 on the right side of FIG. 5 carry a current into the plane of the page. Because lower and upper coil leads 42 and 58 are each formed in a spiral, adjacent traces on either the lower coil assembly 40 or upper coil assembly 50 will carry current the same direction. Thus, substantially circular magnetic fields 60 and 61 are generated around lower and upper coil leads 42 and 58, respectively. Because fields 60a and 61a are of like polarity in the region between coil leads 42 and 58, a force 62 is created therebetween. Lower coil leads 42 on the left hand side of FIG. 5 carry current perpendicularly into the plane of FIG. 5 and upper coil leads 58 on the left hand side of FIG. 5 carry current perpendicularly out of the plane of FIG. 5. Thus, substantially circular magnetic fields 61a and 60b of like polarity in a region between leads 42 and 58 are generated adding to the repulsive force 62. Force 62 tends to displace coil leads 58 and 42, and thus, coil assemblies 40 and 50 vertically away from one another.

The magnetic field configuration shown in FIG. 5 results from lower and upper coil leads 42 and 58, respectively, being formed on lower and upper coil assemblies 40 and 50, respectively, in a spiral, such as that shown in FIG. 1. It is also within the ambit of the present invention to form the lower and upper coil leads 42 and 58, respectively, in any other configuration that produces a force therebetween.

Figure 6:
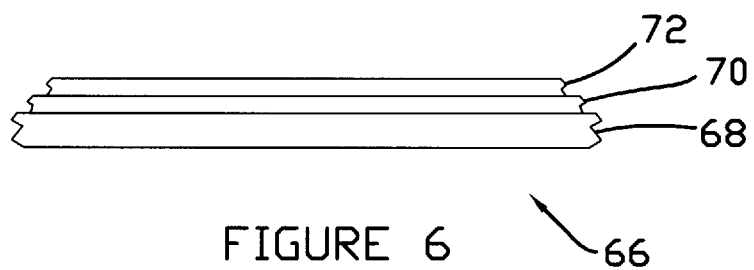
FIG. 6 is a side view illustration of laminated sheet material from which the head suspension shown in FIG. 1 can be fabricated.

A method for manufacturing load beam 12 and microactuator 10 can be described with reference to FIGS. 2 and 6. In the embodiment shown in FIG. 1, all the features of load beam 12 with the exception of the flexure 16 and baseplate 20 can be manufactured from a single sheet 66 of material shown in FIG. 6. Sheet 66 includes a lower layer 68 of stainless steel or other resilient material; an intermediate layer 70 of polyimide or other dielectric material overlaying the lower layer; and an upper layer 72 of Cu, BeCu, or other conductor overlaying the intermediate layer. Using conventional or otherwise known techniques such as chemical etching, blanks having the desired external dimensions of the load beam 12 and upper coil assembly 50 are formed from the sheet 66 of material. In the blank having external dimension for load beam 12, the lower layer 68 is patterned and etched to form base 14; spring region 18; rigid region 17 (including both the proximal section 32 and distal section 34); lower coil assembly base 67; arms 44a, 44b, 46, and first and second edge rails 23 and 24. In the blank having external dimensions of upper coil assembly 50, the lower layer 68 is patterned and etched to form upper coil assembly base 47 and arms 52a, 52b, 52c, and 52d.

In the blank having external dimensions of load beam 12, the intermediate layer 70 and upper layer 72 are patterned and etched to form coil lead 42; contacts 49, 51 and 56; and electrical leads 48a and 48b. In the blank having external dimensions of upper coil assembly 50, the intermediate layer 70 and upper layer 72 are patterned and etched to form coil lead 58, and contacts 53. Electrical leads 54 are formed by removing lower layer 68 by etching, leaving just the intermediate dielectric layer 70 and the upper conducting layer 72. After completing this process, as shown in FIG. 2, a protective layer 45 of dielectric such as a dry film polyimide can be applied over coil leads 42 and 58 having a coating of adhesive applied to the side that interfaces with the coil leads 42 and 58 and dielectric layer 70.

After completing the above described process, first and second edge rails 23 and 24 are formed in the edges of rigid region 17. Upper coil assembly 50 is then inverted and arms 52a, 52b, 52c, and 52d are attached to load beam 12 as described above by welding or otherwise known techniques and upper electrical contacts 53 are attached to lower electrical contacts 49 by soldering or otherwise known techniques.

Figure 7:
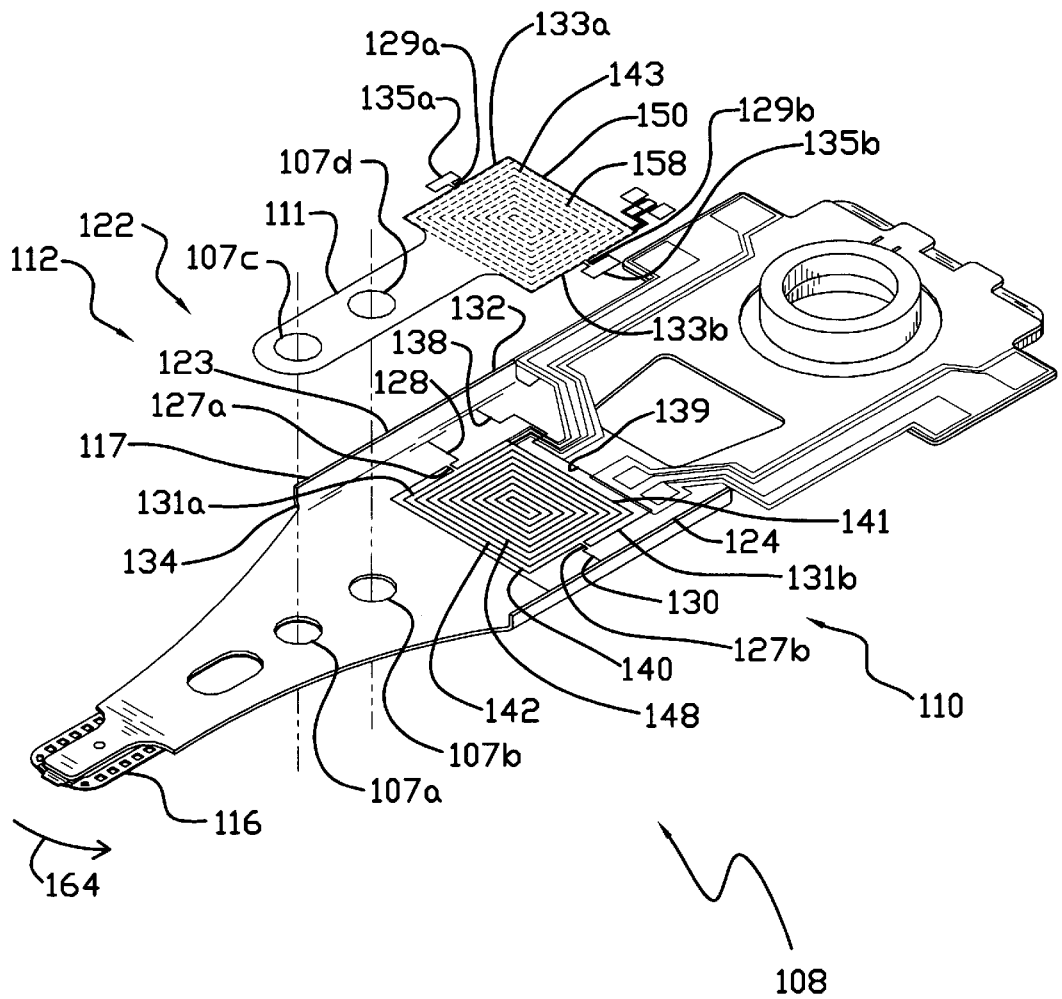
FIG. 7 is a partially exploded isometric view of a head suspension including a stacked coil microactuator connected to a load beam with narrowed linkage fingers in accordance with a second embodiment of the present invention.

FIG. 7 is an illustration of a suspension including another embodiment of the microactuator and linkage of the present invention. Elements in FIG. 7 which are functionally similar to those shown in FIG. 1 are indicated by like numerals incremented by 100. Suspension 108 includes a load beam 112 with a rigid region 117 having a proximal section 132 and a distal section 134. An open region 138 extends between proximal section 132 and distal section 134. A tracking linkage 122 which connects proximal and distal sections 132 and 134 for motion about a tracking axis includes first and second edge rails 123 and 124 formed in transversely opposite sides of the rigid region 117. Vertically adjacent lower and upper coil assemblies 140 and 150, respectively, like coil assemblies 40 and 50, shown in FIG. 1, are positioned in the open region 138 forming generally rectangular gap 139 around upper coil assembly 150 and lower coil assembly 140. Upper coil assembly 150 and lower coil assembly 140 each have a stainless steel base beneath a dielectric intermediate layer (not shown). Lower coil assembly 140 includes lower electromagnetic field generating coil 141 having electrical conducting leads 142 and upper coil assembly 150 includes upper magnetic field generating coil 143 having upper electrical conducting leads 158.

In addition to first edge rail 123 and second edge rail 124, tracking linkage 122 includes first member 128, second member 130, first lower transverse finger 127a, and second lower transverse finger 127b. First member 128 extends parallel and adjacent to the first edge rail 123 from the distal section 134, into the open region 138, towards the proximal section 132. Second member 130 extends parallel and adjacent to edge rail 124 from the proximal section 132 into gap 139 towards the distal section 134. First lower transverse finger 127a extends from the first member 128, across gap 139, and is attached to edge 131a of the base of lower coil assembly 140. Second lower transverse finger 127b extends from the second member 130, across gap 139, and is attached to edge 131b of the base of lower coil assembly 140.

Tracking linkage 122 also includes first upper transverse finger 129a, second upper transverse finger 129b, first upper mounting tab 135a, and second upper mounting tab 135b. First upper transverse finger 129a and second upper transverse finger 129b extend out from transversely opposite edges 133a and 133b of upper coil assembly 150 and are attached, respectively, to upper mounting tabs 135a and 135b. Mounting tabs 135a and 135b are attached, respectively, to first and second members 128 and 130 by welding or any other method known in the art. Alignment holes 107a and 107b, are positioned in the distal section of the rigid region and alignment holes 107c, and 107d are positioned in nose 111 protruding from the base of upper coil assembly 150. Alignment holes 107a, 107b, 107c, and 107d are used during assembly of load beam 112 to align upper conducting coil assembly 150 vertically adjacent to lower conducting coil assembly 140.

Figure 8:
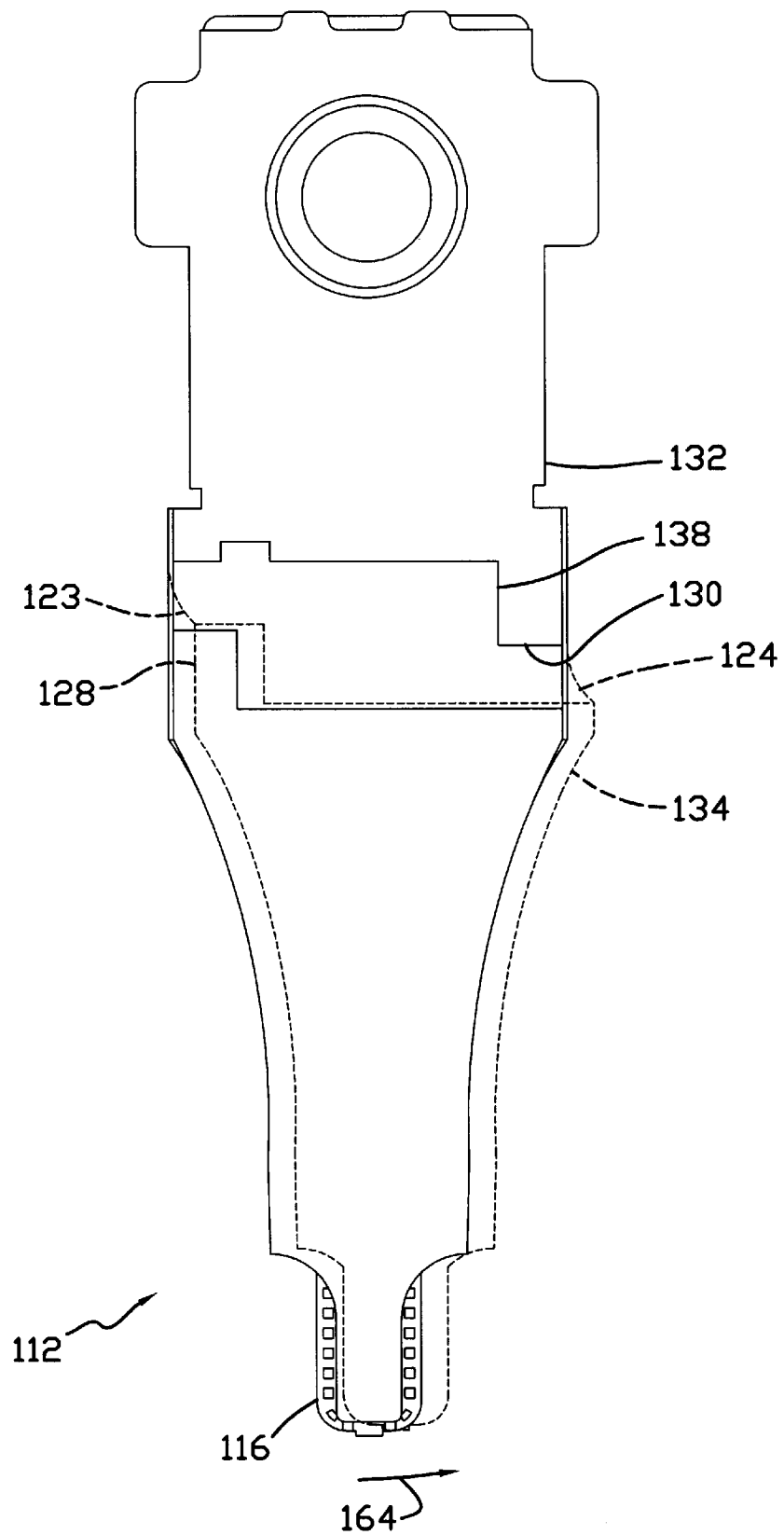
FIG. 8 is a schematic top view of the head suspension shown in FIG. 7 with the microactuator and load beam shown in an actuated position in phantom.

Microactuator 110 is responsive to tracking control signals for displacing the lower and upper coil assemblies 140 and 150, respectively, vertically away from each other. The motion that the load beam undergoes in response to this vertical displacement is shown in phantom (to an exaggerated extent for purposes of illustration) in FIG. 8. First and second edge rails 123 and 124 are resilient such that when lower and upper coil assemblies 140 and 150, respectively, vertically displace, upper and lower fingers 127a and 129a, respectively, pull the first member 128 transversely towards the coil assemblies 140 and 150, respectively, and pull the lower and upper coil assemblies 140 and 150, respectively, transversely towards the second member 130. Because the second member 130 is rigidly attached to the proximal section 132 of the rigid region 117 which is fixed with respect to the load beam 112, the distal end 134 including the flexure 116 moves along the tracking axis 164 with respect to the remainder of the load beam 112. Suspension 108 can be manufactured in a manner similar to that of suspension 8 shown in FIG. 1.

Figure 9:
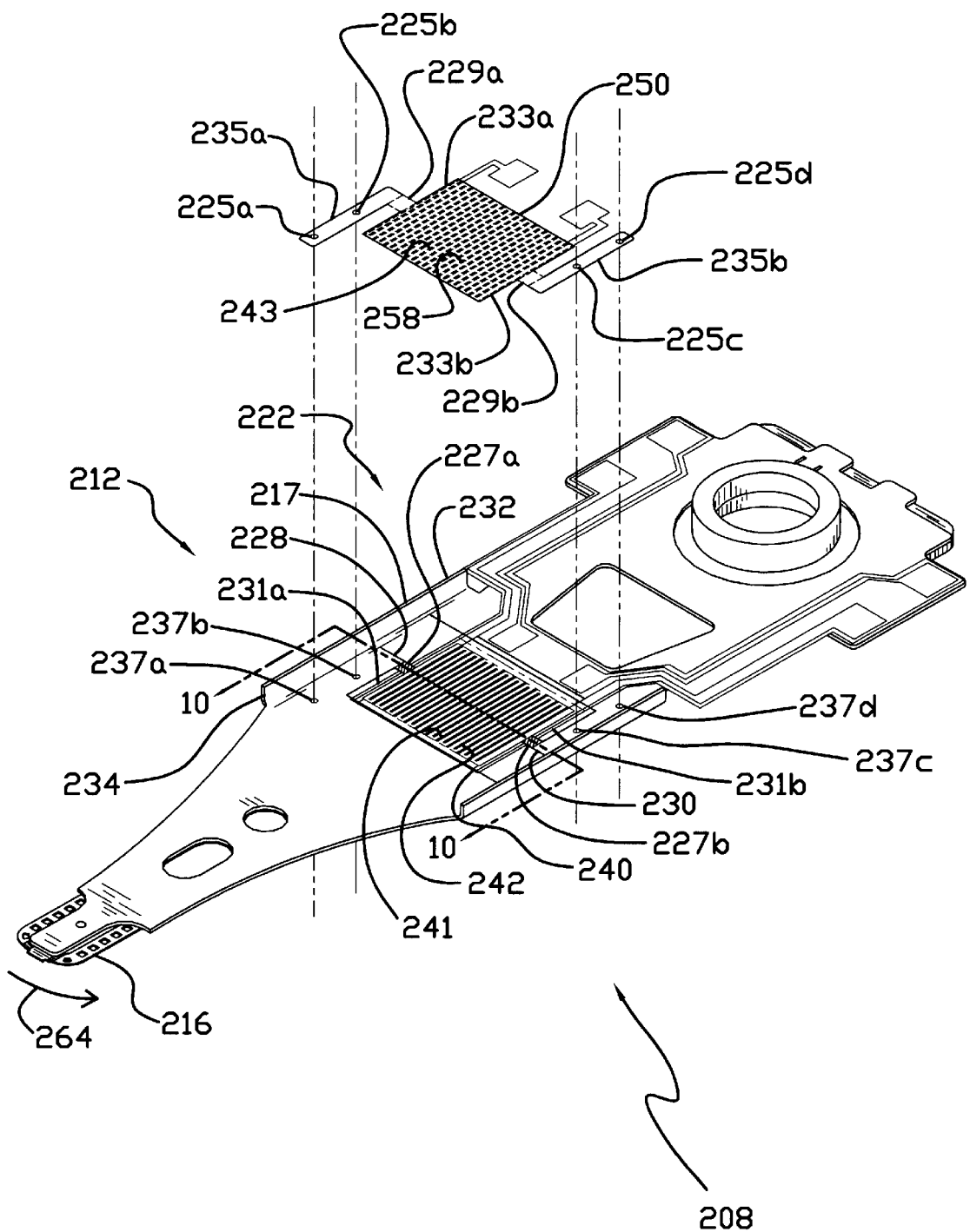
FIG. 9 is an exploded isometric view of a head suspension including a stacked coil microactuator connected to a load beam with reduced thickness linkage fingers in accordance with a third embodiment of the present invention.
Figure 10A:
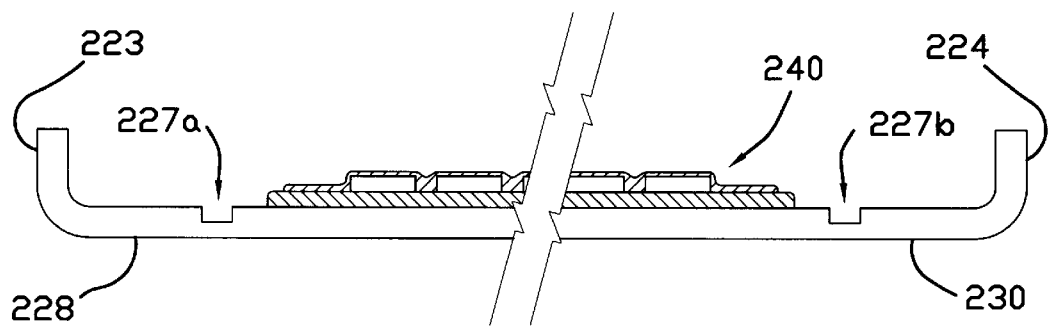
FIG. 10a is a sectional view of the microactuator shown in FIG. 9, taken along line 10—10.

FIG. 9 is an illustration of a suspension 208 including another embodiment of the microactuator and linkage of the present invention. Elements in FIG. 9 which are functionally similar to those shown in FIG. 1 are shown with like numerals incremented by 200. A first difference between load beam 208 of FIG. 9 and load beam 108 of FIG. 7 is that the thickness perpendicular to the load beam of upper transverse fingers 229a and 229b and lower transverse fingers 227a and 227b is reduced from that of the remainder of the load beam 212 by partial etching during manufacturing. This reduced thickness can be most clearly seen in FIG. 10a, which is a sectional view along line 10—10 of FIG. 9 (though only lower fingers 227a and 227b are shown in FIG. 10a, the thickness of upper fingers 229a and 229b can be reduced in a similar manner). This reduced thickness gives upper and lower transverse fingers 229a, 229b, 227a, and 227b, respectively, greater flexibility in a direction perpendicular to the load beam.

Figure 10B:
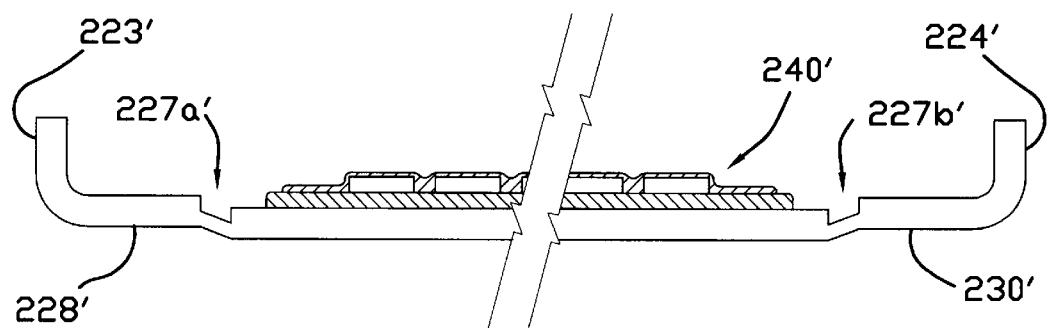
FIG. 10b is a sectional view of a head suspension including a stacked coil microactuator connected to a load beam with sloped reduced thickness linkage fingers.
Figure 11:
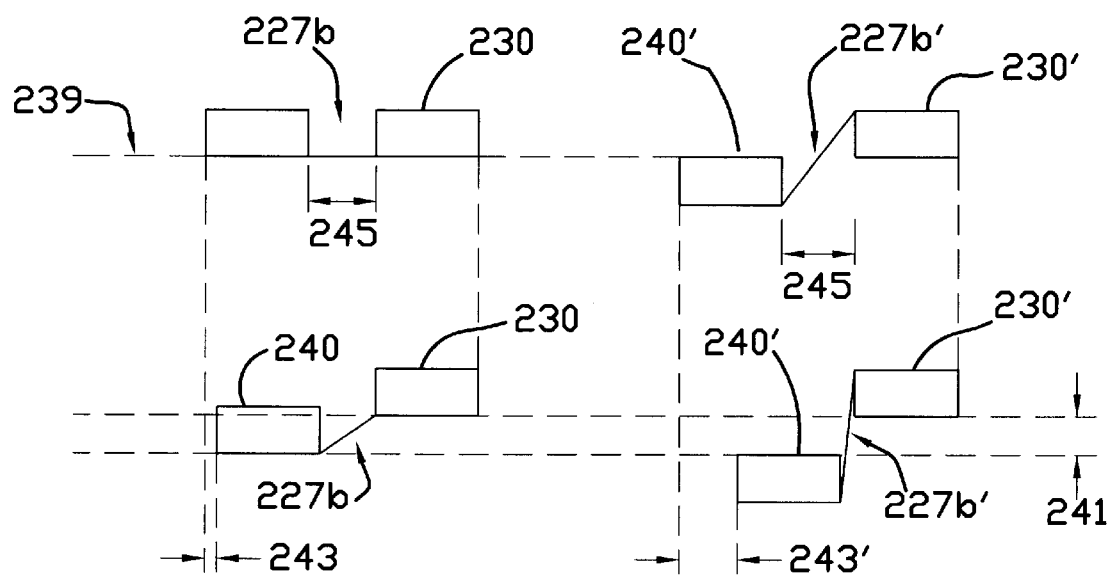
FIG. 11 is a schematic diagram showing the difference in operation between the head suspension of FIG. 9 and that of FIG. 10b.

As shown schematically in FIGS. 10a, 10b, and 11, this reduced thickness also allows upper and lower transverse fingers 227a, 227b, 229a, and 229b, respectively, to be sloped. FIG. 10a is a sectional view of load beam 212 shown in FIG. 9 taken along line 10—10. FIG. 10b is the same sectional view as FIG. 10 taken along a load beam having sloped lower fingers 227a' and 227b' (though only lower fingers 227a, 227b, 227a', and 227b', are shown in FIGS. 10a and 10b, upper fingers 229a and 229b can be analogously sloped). This sloping allows the same vertical displacement of lower and upper coil assemblies 240 and 250, respectively, to translate into a greater horizontal displacement of the distal section 234 of the rigid region 217.

FIG. 11 schematically shows this by comparing the effect of a vertical displacement 241 of lower coil assembly 240 attached to second member 230 by a non-sloped finger 227b, that is, finger 227b is in the same plane as the remainder of the load beam 212, with the effect of the same vertical displacement 241 of lower coil assembly 240' attached to member 230' by a sloped finger 227b'. The top part of FIG. 11 shows that in both cases, lower coil assemblies 240 and 240' and second members 230 and 230' begin with the same horizontal distance 245 therebetween. The bottom part of FIG. 11 shows that both lower coil assemblies 240 and 240' have undergone the same downward vertical displacement 241. However, while lower coil assembly 240 has undergone transverse displacement 243, lower coil assembly 240' has undergone a larger transverse displacement 243'. A larger transverse movement of lower coil assembly 240' results in a greater displacement of a flexure (not shown) along a transverse tracking axis (not shown).

Another difference between load beam 212 shown in FIG. 9 and load beam 112 shown in FIG. 7 is the layout of the upper coil lead 258 and lower coil lead 242. Rather than the generally spiral orientation of coil leads 142 and 158, adjacent lead sections of coil leads 242 and 258 are positioned parallel to one another in a back-and-forth type arrangement. Lower coil lead 242 and upper coil lead 258 could also be arranged in any other configuration such that a force tending to vertically displace lower coil assembly 240 and upper coil assembly 250 is generated therebetween.

Yet another difference between load beam 212 shown in FIG. 9 and load beam 112 shown in FIG. 7 is that in the embodiment shown in FIG. 9, nose 111 has been eliminated and alignment holes 225a, 225b, 225c, and 225d have been placed in upper tabs 235a and 235b, which are larger than tabs 135a and 135b. To align upper coil assembly 250 with lower coil assembly 240 alignment hole 225a is aligned with hole 237a, hole 225b is aligned with hole 237b, hole 225c is aligned with hole 237c, and hole 225d is aligned with hole 237d, alignment holds 237a, 237b, 237c, and 237d being provided in the rigid region 217. Suspension 208 can be manufactured in a manner similar to that of suspension 8 shown in FIG. 1.

Figure 12:
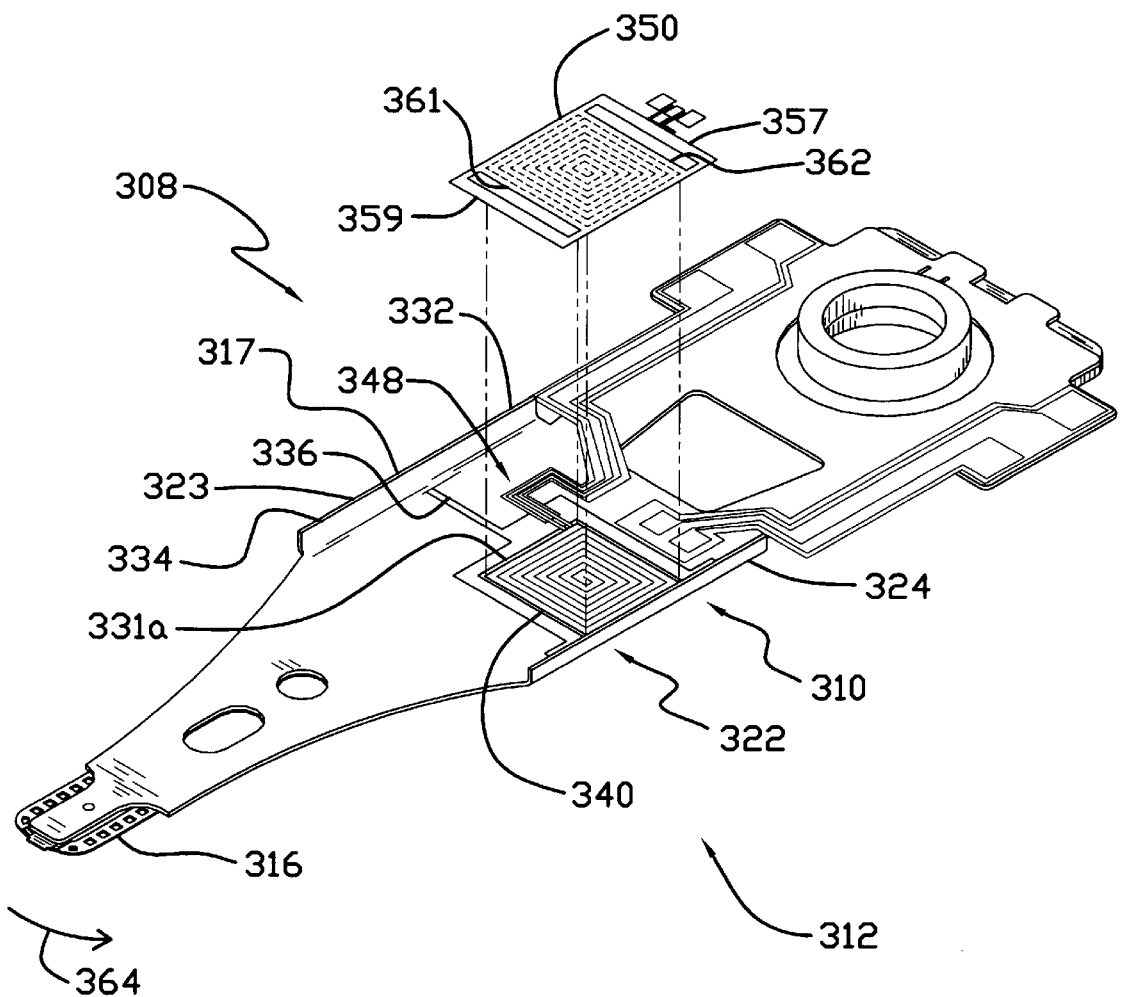
FIG. 12 is a partially exploded isometric view of a head suspension including a microactuator and a linkage connecting a distal section of a load beam to a proximal section with a twistably deformable edge rail in accordance with a fourth embodiment of the present invention.
Figure 13:
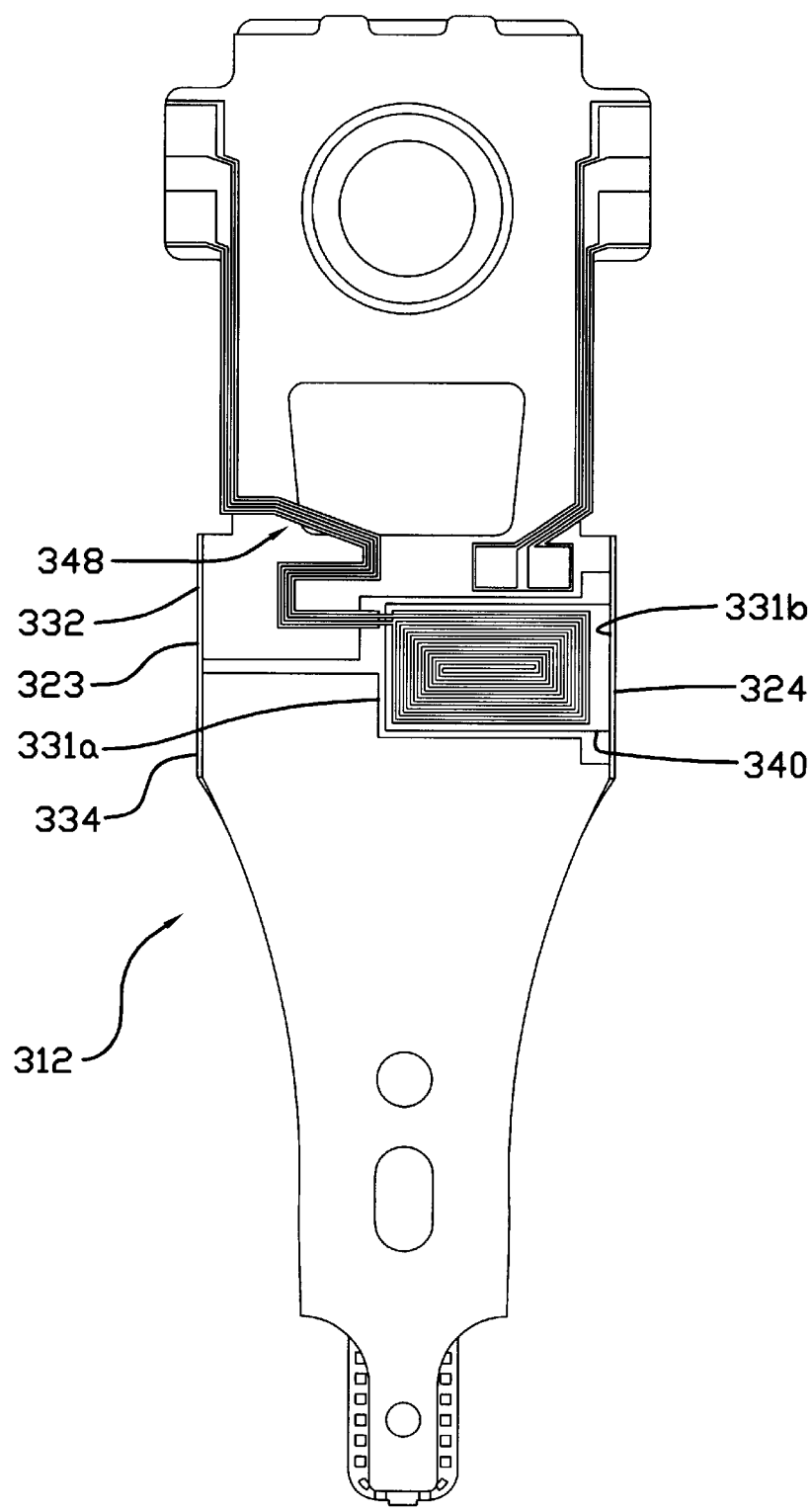
FIG. 13 is a top view of the head suspension shown in FIG. 12.

FIGS. 12 and 13 are illustrations showing a suspension 308 including another embodiment of the present invention. Features in FIGS. 12 and 13 which are functionally similar to those shown in FIG. 1 are indicated by like numerals incremented by 300. In the embodiment shown in FIGS. 12 and 13, the lower coil assembly 340 of microactuator 310 is connected to the second edge rail 324 of tracking linkage 322 along the complete length of lower coil assembly edge 331b. The only other connection between lower coil assembly 340 and load beam 312 is via electrical leads 348, which are connected to lower coil assembly 340 at lower coil assembly edge 331a to allow lower coil assembly 340 to vertically displace out of the plane of the load beam 312.

Linkage 322 includes C-shaped members 359 and 357. Member 359 attaches the distal transverse edge 361 of the base of upper coil assembly 350 to the distal section 334 of the rigid region 317 and member 357 attaches the proximal edge 362 of the base of upper coil assembly 350 to the proximal section 332. Such connections are made by welding or other methods known in the art.

Because lower coil assembly 340 is rigidly connected to the load beam 312 only along lower coil assembly edge 331b, activation of the microactuator 310 causes lower coil assembly 340 to pivot out of the plane of the load beam 312 about second edge rail 324 which is torsionally or twistably resilient so that as lower coil assembly 340 displaces downward, second edge rail 324 twists. This twisted deformation effectively shortens edge rail 324 in the longitudinal direction and pulls the distal section 334 of the rigid region 317 longitudinally towards the proximal section 332. As with load beam 12 shown in FIG. 1, first edge rail 323 is elastically bendable such that as the distal section 334 moves towards the proximal section 332, edge rail 323 bends at the point it intersects with gap 336, tending to close gap 336, such that the distal section 334 pivots with respect to the proximal section 332 about the bend point in edge rail 323. This pivoting action causes the distal section 334 and the flexure 316 including the read/write head (not shown) to move along a transverse tracking axis 364. Suspension 308 can be manufactured in a manner similar to that of suspension 8 shown in FIG. 1.

Figure 14:
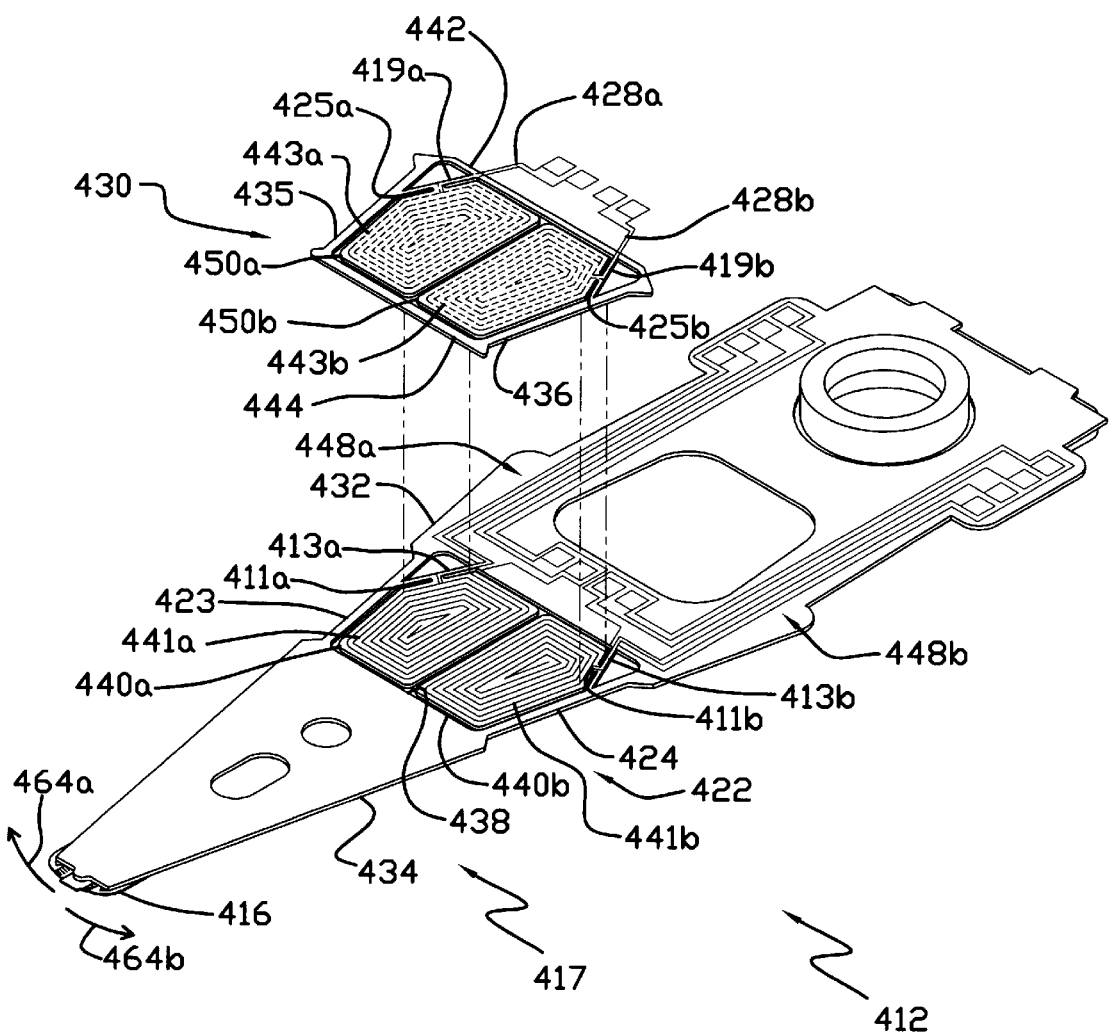
FIG. 14 is an exploded isometric view of a head suspension including a microactuator connected to a torsion arm tracking linkage in accordance with a fifth embodiment of the present invention.
Figure 15:
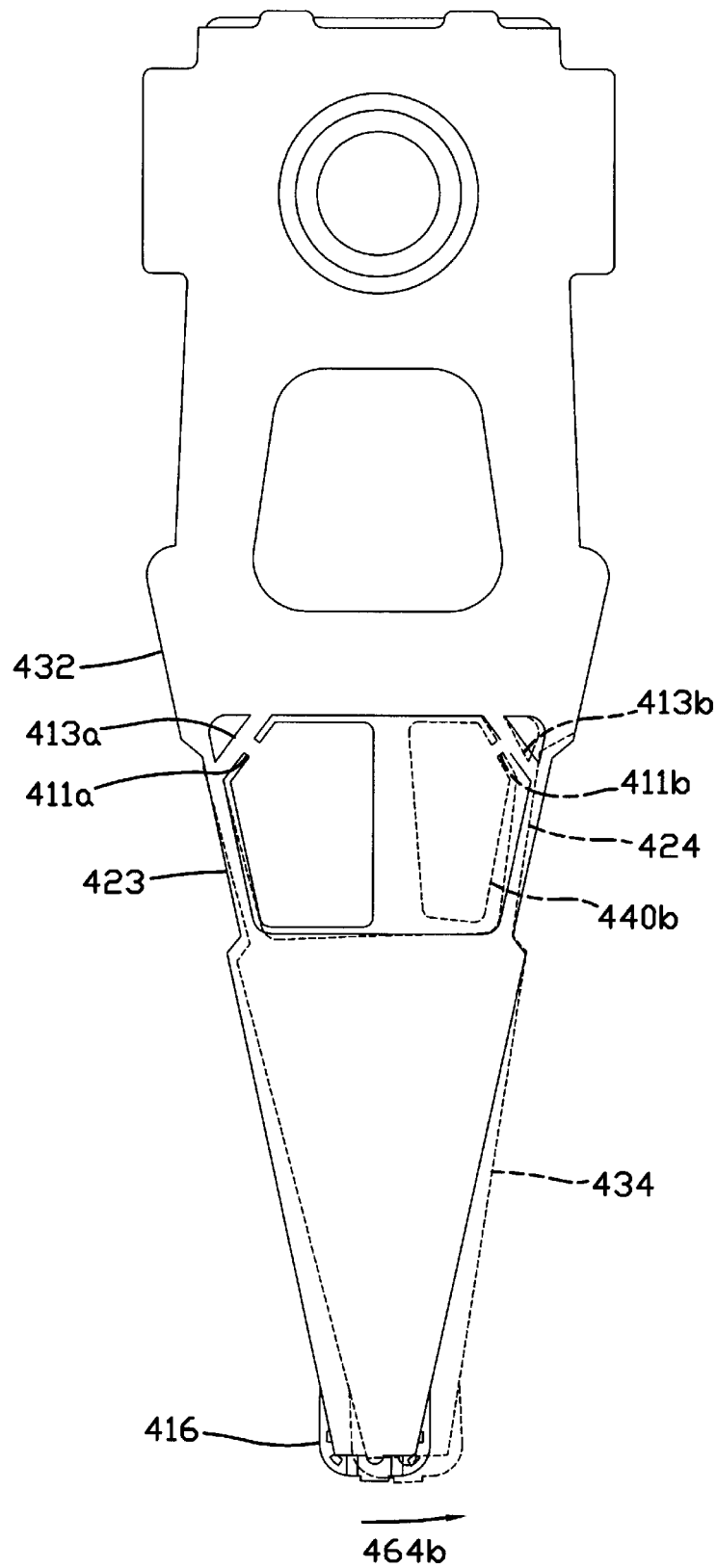
FIG. 15 is a schematic top view of the head suspension shown in FIG. 12 with the microactuator and load beam shown in an actuated position in phantom.

FIGS. 14 and 15 are illustrations of a suspension 408 including another embodiment of the present invention. Elements in FIGS. 14 and 15 which are functionally similar to those shown in FIG. 1 are labeled with the like numbers incremented by 400. The load beam 412 shown in FIG. 14 has first upper coil assembly 450a, second upper coil assembly 450b, first lower coil assembly 440a, and second lower coil assembly 440b. Coil assemblies 440a and 440b are positioned in a substantially trapezoidal open region 438, which is located between a proximal section 432 of a rigid region 417 of load beam 412 and distal section 434 of rigid region 417. A linkage 422 includes first lower edge 423 and second lower edge 424 that connect the proximal section 432 of the rigid region 417 to the distal section 434. Linkage 422 also includes first lower torsion arm 413a, which extends diagonally between edge 423 and section 432, and connects first lower edge 423 to the proximal section 432, and second lower torsion arm 413b, which diagonally connects second lower edge 424 to the proximal section 432. The first lower coil assembly 440a, having magnetic field generating coil 441a, and second lower coil assembly 440b, having magnetic field generating coil 441b, are connected to first and second torsion arms 413a and 413b by first and second lower diagonal fingers 411a and 411b, both also part of linkage 422. Lower electrical leads 448a and 448b connect a tracking servo control (not shown) to the first and second lower coil assemblies 440a and 440b, respectively, via the first and second lower torsion arms 413a and 413b, respectively, and first and second lower diagonal fingers 411a and 411b, respectively.

First and second upper coil assemblies 450a and 450b, respectively, including first and second upper magnetic field generating coils 443a and 443b, respectively, are positioned within a support frame 430 of linkage 422. Support frame 430 includes first and second upper edges 435 and 436, respectively, and proximal and distal members 442 and 444, respectively. First upper torsion arm 419a extends diagonally between, and has its opposite ends connected to, first upper edge 435 and proximal member 442. Second upper torsion arm 419b extends diagonally between, and has its opposite ends connected to, upper edge 436 and proximal member 442. Upper coil assemblies 450a and 450b are respectively connected to torsion arms 419a and 419b via first and second upper diagonal fingers 425a and 425b. Upper electrical leads 428a and 428b connect a tracking servo control (not shown) to first and second upper coil assemblies 450a and 450b, respectively, via first and second upper torsion arms 419a and 419b, and first and second upper diagonal fingers 425a and 425b.

To cause flexure 416 to move along transverse tracking axis 464a, the tracking signal source (not shown) applies a current to first upper and lower coil assemblies 450a and 440a, respectively. To cause the flexure 416 to move along transverse tracking axis 464b, a tracking signal is applied to second upper and lower coil assemblies 450b and 440b, respectively. The only connection between the rigid region 417 and first lower coil assembly 440a is through first lower diagonal finger 41 la and first lower torsion arm 413a. Thus, when first lower coil assembly 440a is activated, it pivots downward out of the plane of the load beam 412, about torsion arm 413a. This motion twists torsion arm 413a, effectively shortening its length and deforming first edge 423 towards first lower coil assembly 440a. The deformation pulls distal section 434 of the rigid region 417 towards proximal section 432. Because edge 424 has not been shortened, distal section 434, including flexure 416, pivots about edge 424. Additionally, the position of proximal section 432 is fixed relative to a base 414 of load beam 412. Thus, pivoting the distal section 434 towards the proximal section 432 about edge 424 tends to move the flexure 416 along the transverse tracking axis 464a.

Proximal member 442 of support 430 is attached to the proximal section 432 of the rigid region 417, and distal member 444 of support 430 is attached to the distal section 434, by welding or any other method known in the art. Thus, activation of first upper coil assembly 450a deforms a first support edge 435 and tends to move flexure 416 along transverse tracking axis 464a. Upper and lower coil assemblies 440a and 450a, respectively, can be activated simultaneously to move the flexure 416 along tracking axis 464a. Simultaneous activation of upper and lower coil assemblies 440b and 450b, respectively, moves the flexure 416 along tracking axis 464b. Suspension 408 can be manufactured in a manner similar to that of suspension 8 shown in FIG. 1.

Figure 16:
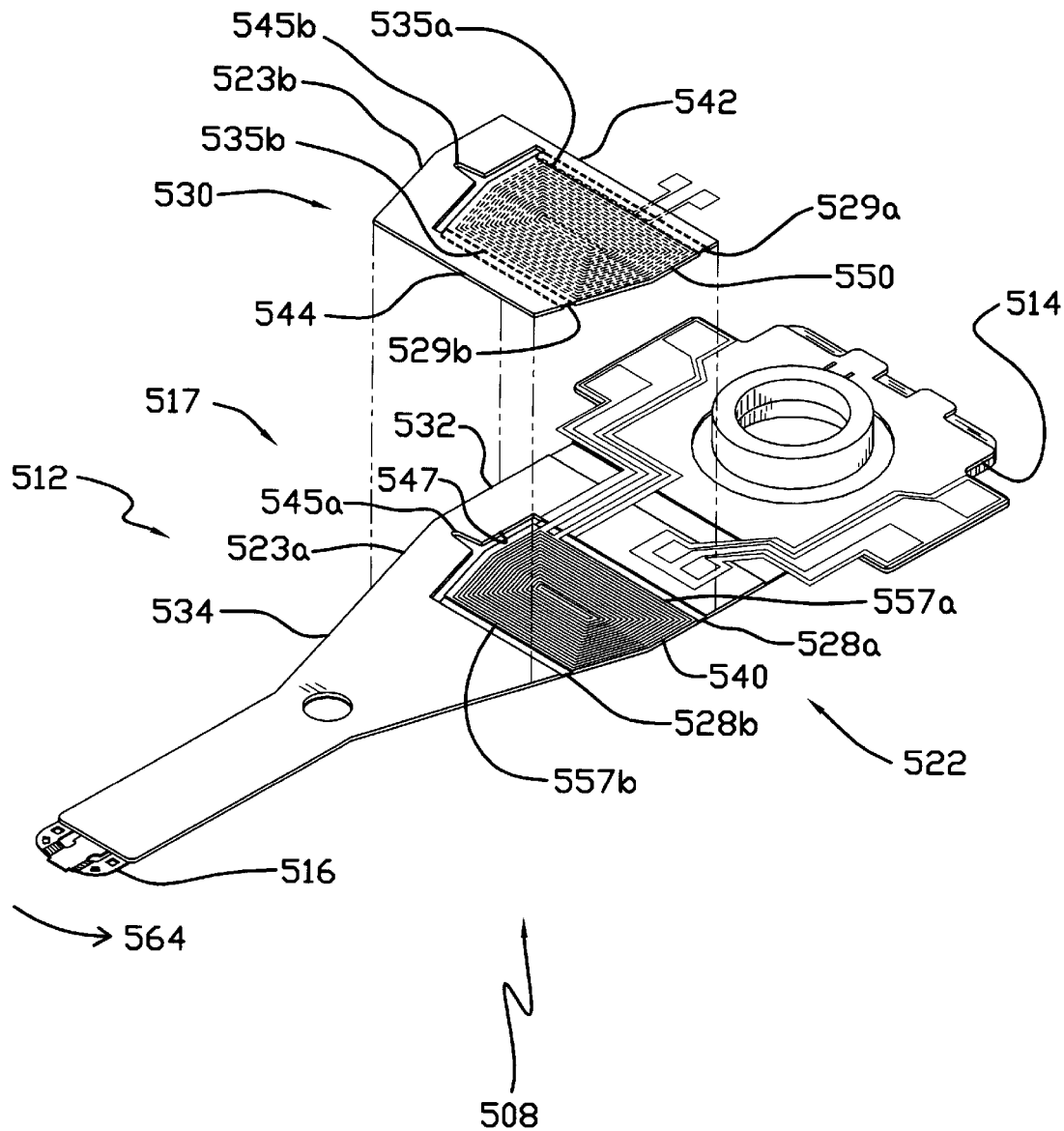
FIG. 16 is an exploded isometric view of a head suspension including a transverse notch tracking linkage in accordance with a sixth embodiment of the present invention.

FIG. 16 is an illustration of a suspension 508 including yet another embodiment of the stacked coil microactuator and tracking linkage of the present invention. Elements in FIG. 16 which are functionally similar to those shown in FIG. 1 are labeled with the like numbers incremented by 500. Load beam 512 has lower coil assembly 540 that has first and second lower edges 557a and 557b, respectively. Linkage 522 has reduced thickness trough 528a between lower edge 557a and the proximal section 532 of the rigid region 517. Linkage 522 also includes reduced thickness trough 528b between transverse edge 557b and distal section 534 of the rigid region 517. The thickness of troughs 528a and 528b is reduced from that of the remainder of load beam 512 by etching or any method known in the art.

Longitudinal edge 523a of linkage 522 connects the proximal section 532 to the distal section 534 of the rigid region 517. Adjacent to longitudinal edge 523a is longitudinal slot 547 extending from first reduced thickness trough 528a to second reduced thickness trough 528b. Approximately midway between first and second troughs 528a and 528b, respectively, transverse notch 545a, part of linkage 522, opens towards longitudinal edge 523a from slot 547.

Reduced thickness troughs 528a and 528b are resilient and so allow lower coil assembly 540 to displace downward when activated by a tracking servo control (not shown). Reduced thickness troughs 528a and 528b of linkage 522 translate the vertical displacement of the coil assembly 540 into displacement in the plane of the load beam of the distal section 534 towards the proximal section 532. Because longitudinal edge 523a is substantially incompressible in the longitudinal direction, as distal section 534 is displaced towards proximal section 532, distal section 534 pivots about a point where notch 545 intersects edge 523, tending to close notch 545a. Because the proximal section 532 of the rigid region is fixed to the base 514 of the load beam 512, the proximal section 532 remains stationary in response to the pivotal motion of distal section 534. Further, because the flexure is fixed to the distal section 534 this movement translates the flexure 516 along the tracking axis 564 with respect to the proximal section 532.

Support frame 530 holds upper coil assembly 550. First upper reduced thickness trough 529a of linkage 522 is located between the first upper transverse edge 535 of upper coil assembly 550 and proximal member 542 of linkage 522. Second upper reduced thickness trough 529b of linkage 522 is located between the second upper transverse edge 535b of upper coil assembly 550 and distal member 544 of linkage 522. The thickness of troughs 529a and 529b is reduced from the thickness of the remainder of support frame 530 by etching or any method known in the art. Proximal member 542 of linkage 522 is attached to the proximal section 532 of the rigid region 517, and distal member 544 of linkage 522 is attached to the distal section 534. These attachments can be made by welding or other methods known in the art.

When lower and upper coil assemblies 540 and 550, respectively, are activated, upper coil assembly 550 displaces vertically upward away from lower coil assembly 540. This motion causes reduced thickness linkage troughs 529a and 529b via, respectively, linkage members 542 and 544, to pull the distal section 534 of rigid region 517 towards the proximal section 532. Upper edge rail 523b is substantially rigid in a longitudinal direction, thus, pulling the distal section 534 towards the proximal section 532 causes the distal section 534 to pivot about a point where edge rail 523b intersects with an upper notch 545b, tending to close upper notch 545b. As above, this tends to move flexure 516 along transverse tracking axis 564. Suspension 508 can be manufactured in a manner similar to that of suspension 8 shown in FIG. 1.

Though the present invention has been described with reference to preferred embodiments, those skilled in the art will recognize that changes can be made in form and detail without departing from the spirit and scope of the invention.

What is claimed is:

1. A disk drive suspension configured for attachment to an actuator arm, including:
   a load beam having a proximal end, a distal end, and a rigid region between the proximal end and the distal end;
   a flexure at the distal end of the load beam, the flexure configured for receiving and supporting a read/write head;
   a microactuator on the load beam and including first and second spaced actuator members responsive to tracking control signals wherein in response to tracking control signals at least the first actuator member generates a force on the second actuator member which causes a relative displacement between the first and second actuator members; and
   a linkage coupled to the microactuator for translating the relative displacement between the first and second actuator members into a displacement of the distal end of the load beam including the flexure along a transverse tracking axis.

2. The disk drive suspension of claim 1 wherein:
   the load beam includes a substantially planar rigid region; and
   the relative displacement between the first and second actuator members is in a direction generally perpendicular to a plane defined by the substantially planar rigid region of the load beam.

3. The disk drive suspension of claim 2 wherein both the first and second actuator members include magnetic field generating coils.

4. The disk drive suspension of claim 3 wherein:
   the rigid region of the load beam includes a proximal section and a distal section; and
   the linkage includes:
      at least one resilient member connecting the distal section to the proximal section such that the distal section can pivot about a connection point with respect to the proximal section; and at least a first linkage member connecting the first actuator member to the proximal section and at least a second linkage member connecting the first actuator member to the distal section, such that in response to a displacement of the first actuator member, the first and second linkage members cause a distance in the plane of the load beam between the proximal section and the distal section to change, the change in distance causing the distal section to pivot with respect to the proximal section and move the flexure along the transverse tracking axis.

5. The disk drive suspension of claim 3 wherein:

the rigid region of the load beam includes a proximal section and a distal section; and the linkage includes:

at least one longitudinally extending rail connecting the distal section to the proximal section; and at least one linkage member coupling the first actuator member to the longitudinally extending rail, such that in response to tracking control signals a displacement of the first actuator member causes the linkage member to transversely displace the longitudinally extending rail moving the distal section of the load beam including the flexure along the transverse tracking axis.

6. The disk drive suspension of claim 3 wherein:

the rigid region of the load beam includes a proximal section and a distal section; and the linkage includes:

a first linkage member coupled to the first actuator member and connecting the proximal section to the distal section such that a twisting deformation of the first linkage member changes a distance in the plane of the load beam between the proximal section and the distal section; and a second linkage member connecting the proximal section to the distal section allowing the distal section to pivot with respect to the proximal section, such that in response to tracking control signals, a rotation of the first actuator member twistably deforms the first linkage member causing the distal section of the load beam to pivot with respect to the proximal section and move the flexure along the transverse tracking axis.

7. The disk drive suspension of claim 3 wherein:

the rigid region of the load beam includes a distal section, a proximal section, and an open region therebetween;

the first and second actuator members are located in the open region; and the linkage includes:

first and second longitudinal edge rails, the second edge rail connecting the proximal section of the rigid region to the distal section;

a resilient transverse arm coupling the second edge rail to the first actuator member; and a gap between the proximal section and the distal section and extending from the first edge rail to the open region;

such that in response to tracking control signals, a displacement of the first actuator member causes the transverse arm of the linkage to deform the second edge rail into the open region changing a longitudinal distance between the proximal section and the distal section causing the distal section of the rigid region to pivot with respect to the proximal section at an intersection of the gap and the first edge rail and moving the flexure along the transverse tracking axis with respect to the proximal section of the rigid region.

8. The disk drive suspension of claim 7 wherein the linkage includes:

first and second longitudinal arms coupling the second actuator member to the proximal section of the rigid region;

third and fourth longitudinal arms coupling the second actuator member to the distal section; and such that in response to a displacement of the second actuator member, the first, second, third, and fourth linkage arms change a longitudinal distance between the proximal section and the distal section, moving the distal section including the flexure along the transverse tracking axis.

9. The disk drive suspension of claim 8 wherein the second actuator member is attached to the proximal and distal section of the rigid region by resilient members.

10. The disk drive suspension of claim 8 wherein the second actuator member is resilient.

11. The disk drive suspension of claim 8 wherein the first and second actuator members displace away from each other.

12. The disk drive suspension of claim 3 wherein:

the rigid region of the load beam includes a distal section and a proximal section and an open region therebetween;

the first and second actuator members are located in the open region, and the linkage includes:

first and second longitudinal edge rails connecting the proximal section of the rigid region to the distal section;

a first linkage member extending from the distal section along the first longitudinal edge rail and connected to the first actuator member at a first location; and a second linkage member extending from the proximal section along the second longitudinal edge rail and connected to the first actuator member at a second location transversely spaced from the first location;

such that in response to tracking control signals, a vertical displacement of the first actuator member changes a transverse distance between the first and second locations causing the distal section of the rigid region including the flexure to shift transversely, moving the flexure along the transverse tracking axis with respect to the proximal section of the rigid region.

13. The disk drive suspension of claim 12 wherein the first linkage member is attached to the second actuator member at a first location and the second linkage member is attached to the second actuator member at a second location transversely spaced from the first location such that a displacement of the second actuator member changes a transverse distance between the first and second locations causing the distal section of the rigid region including the flexure to shift transversely, moving the flexure along the transverse tracking axis with respect to the proximal section of the rigid region.

14. The disk drive suspension of claim 13 wherein both the first and second actuator members are attached to the first and second linkage members by resilient transverse fingers which have a reduced thickness with respect to a remainder of the load beam.

15. The disk drive suspension of claim 14 wherein the resilient transverse fingers are sloped with respect to a plane of the load beam such that the displacement of the first actuator member and the displacement of the second actuator member cause a greater transverse displacement of the distal end of the load beam including the flexure along the transverse tracking axis than would be caused if the fingers remained in the plane of the load beam.

16. The disk drive suspension of claim 3 wherein:
the rigid region of the load beam includes a distal section, a proximal section, and an open region therebetween;
the linkage includes first and second resilient longitudinal edge rails, the second edge rail connecting the proximal section of the rigid region to the distal section;
the first actuator member is located in the open region and includes an outer edge parallel and connected to the second edge rail along a length thereof, and
the second actuator member is located in the open region;
such that in response to tracking control signals, a rotation of the first actuator member out of a plane of the load beam twistedly deforms the second edge rail decreasing a longitudinal distance between the proximal section and the distal section and causing the distal section of the rigid region including the flexure to pivot about a point along the first longitudinal edge rail, moving the flexure along the transverse tracking axis with respect to the proximal section.

17. The disk drive suspension of claim 16 wherein the second actuator member is affixed to the proximal section of the rigid region and is further affixed to the distal section of the rigid region such that a displacement of the second actuator member decreases a longitudinal distance between proximal section and distal section pivoting the distal section about a point along the first edge rail and moving distal section including the flexure along the transverse tracking axis.

18. The disk drive suspension of claim 17 wherein the second actuator member is attached to the proximal and distal sections of the rigid region by resilient members.

19. The disk drive suspension of claim 17 wherein the second actuator member is resilient.

20. The disk drive suspension of claim 17 wherein the second actuator member is attached to the proximal section of the rigid region along a proximal edge of the second actuator member and is attached to the distal section of the rigid region along a distal edge of the second actuator member.

21. The disk drive suspension of claim 3 wherein:
the rigid region of the load beam includes a distal section, a proximal section, and an open region therebetween;
the first actuator member of the microactuator includes first and second lower magnetic field generating coil assemblies;
the second actuator member of the microactuator includes first and second upper magnetic field generating coil assemblies vertically spaced from the first and second lower coil assemblies; and
the linkage includes:
first and second lower longitudinal edge rails each having two ends and connecting the proximal section of the rigid region to the distal section;
a first lower torsion arm diagonally connecting the first lower edge rail to the proximal section; and
a first lower finger connecting the first lower coil assembly to the first lower torsion arm;
such that in response to tracking control signals, the first lower coil assembly rotates out of a plane of the load beam and the first lower finger of the linkage twists the first lower torsion arm shortening a longitudinal distance between the ends of the first lower edge rail such that the distal section of the rigid region including the flexure pivots about a point along the second lower edge rail with respect to the proximal section, moving the flexure along the transverse tracking axis.

22. The disk drive suspension of claim 21 wherein the linkage also includes:
a second lower torsion arm diagonally connecting the second lower edge rail to the proximal section; and
a second lower finger connecting the second lower coil assembly to the second lower torsion arm;
such that in response to tracking control signals, the second lower coil assembly rotates out of the plane of the load beam and the second lower finger of the linkage twists the second lower torsion arm shortening a longitudinal distance between the ends of the second lower edge rail such that the distal section of the rigid region including the flexure pivots about a point along the first lower edge rail with respect to the proximal section, moving the flexure along the transverse tracking axis.

23. The disk drive suspension of claim 21 wherein: the linkage includes:
a support frame for supporting the first and second upper coil assemblies and having a proximal member attached to the proximal section of the rigid region and distal member attached to the distal section of the rigid region;
first and second upper longitudinal edge rails each having two ends and connecting the proximal member of the support frame to the distal member of the support frame;
a first upper torsion arm diagonally connecting the first upper edge rail to the proximal support member; and
a first upper finger connecting the first upper coil assembly to the first upper torsion arm;
such that in response to tracking control signals, the first upper coil assembly rotates out of a plane of the load beam and the first upper finger of the linkage twists the first upper torsion arm shortening the longitudinal distance between the ends of the first upper edge rail such that the distal section of the rigid region including the flexure pivots about a point along the second upper edge rail with respect to the proximal section, moving the flexure along the transverse tracking axis.

24. The disk drive of claim 23 wherein the linkage further includes:
a second upper torsion arm diagonally connecting the second edge rail to the proximal support member; and
a second upper finger connecting the second upper coil assembly to the second upper torsion arm;
such that in response to tracking control signals the second upper coil assembly rotates out of the plane of the load beam and the second upper finger of the linkage twists the second upper torsion arm shortening the longitudinal distance between the ends of the second upper edge rail such that the distal section of the rigid region including the flexure pivots about a point along the first upper edge rail with respect to the proximal section, moving the flexure along the transverse tracking axis.

25. The disk-drive suspension of claim 3 wherein:
the rigid region of the load beam includes a distal section, a proximal section, and an open region therebetween;
the first actuator member of the microactuator includes a lower proximal edge and a lower distal edge; and
the linkage includes:
a lower longitudinal edge rail connecting the distal section of the rigid region to the proximal section;
a resilient first lower partial thickness trough connecting the proximal edge of the first actuator member to the proximal section; and a resilient second lower partial thickness trough connecting the distal edge of the first actuator member to the distal section; and a transverse lower notch extending from the open region to the longitudinal edge rail;

such that in response to tracking control signals, a displacement of the first actuator member decreases a longitudinal distance between the distal and proximal sections of the rigid region pivoting the distal section with respect to the proximal section about the lower notch, moving the flexure along the transverse tracking axis with respect to the proximal section.

26. The disk drive suspension of claim 25 wherein:

the second actuator member of the microactuator includes an upper proximal edge and an upper distal edge; and the linkage includes:

a support frame for supporting the second actuator member and having a proximal member attached to the proximal section of the rigid region, a distal member attached to the distal section of the rigid region, and an upper longitudinal edge rail;

an upper notch extending from the open region towards the upper transverse edge;

a first upper partial thickness trough connecting the upper proximal member of the support frame to the proximal edge of the second actuator member along an entire length thereof; and a second upper partial thickness trough connecting the upper distal member of the support frame to the distal edge of the second actuator member along an entire length thereof;

such that a displacement of the second actuator member decreases a longitudinal distance between the distal and proximal sections of the rigid region pivoting the distal section with respect to the proximal section about the upper notch, moving the flexure along the transverse tracking axis with respect to the proximal section.

27. The disk drive suspension of claim 3 wherein the load beam is fabricated from a multi-layered sheet of material including a lower layer of stainless steel; an intermediate dielectric layer; and an upper conducting layer.

28. The disk drive suspension of claim 27 wherein the first and second actuator members are fabricated from the multi-layered sheet of material such that the magnetic field generating coil of the first actuator member includes a stainless steel base; a conducting lead; and a dielectric layer between the stainless steel base and the conducting lead.

29. The disk drive suspension of claim 27 wherein the second actuator member includes a magnetic field generating coil having a stainless steel base; a conducting lead; and a dielectric layer between the stainless steel base and the conducting lead.

30. A disk drive suspension configured for attachment to an actuator, including:

a load beam having a proximal end, a distal end, and a substantially planar rigid region between the proximal end and the distal end;

a flexure at the distal end of the load beam, the flexure configured for receiving and supporting a read/write head;

a microactuator on the load beam and including first and second spaced actuator members wherein in response to tracking control signals, at least the first actuator member generates a force on the second actuator member which causes a relative displacement between the first and second actuator members in a direction out of a plane defined by the substantially planar rigid region of the load beam; and a linkage coupled to the microactuator for translating the relative displacement between the first and second actuator members into a displacement of the distal end of the load beam including the flexure along a transverse tracking axis.

31. The disk drive suspension of claim 30 wherein the relative displacement between the first and second actuator members is in a direction generally perpendicular to the plane defined by the substantially planar rigid region of the load beam.

32. The disk drive suspension of claim 31 wherein both the first and second actuator members include magnetic field generating coils.

33. The disk drive suspension of claim 32 wherein:

the rigid region of the load beam includes a proximal section and a distal section; and the linkage includes:

at least one resilient member connecting the distal section to the proximal section such that the distal section can pivot about a connection point with respect to the proximal section; and at least a first linkage member connecting the first actuator member to the proximal section and at least a second linkage member connecting the first actuator member to the distal section, such that in response to a displacement of the first actuator member, the first and second linkage members cause a distance in the plane of the load beam between the proximal section and the distal section to change, the change in distance causing the distal section to pivot with respect to the proximal section and move the flexure along the transverse tacking axis.

34. The disk drive suspension of claim 32 wherein:

the rigid region of the load beam includes a proximal section and a distal section; and the linkage includes;

at least one longitudinally extending rail connecting the distal section to the proximal section; and at least one linkage member coupling the first actuator member to the longitudinally extending rail, such that in response to tracking control signals a displacement of the first actuator member causes the linkage member to transversely displace the longitudinally extending rail moving the distal section of the load beam including the flexure along the transverse tracking axis.

35. The disk drive suspension of claim 32 wherein:

the rigid region of the load beam includes a proximal section and a distal section; and the linkage includes:

a first linkage member coupled to the first actuator member and connecting the proximal section to the distal section such that a twisting deformation of the first linkage member changes a distance in the plane of the load beam between the proximal section and the distal section; and a second linkage member connecting the proximal section to the distal section allowing the distal section to pivot with respect to the proximal section, such that in response to tracking control signals, a rotation of the first actuator member twistably deforms the first linkage member causing the distal section of the load beam to pivot with respect to the proximal section and move the flexure along the transverse tracking axis.

* * * * *

UNITED STATES PATENT AND TRADEMARK OFFICE
CERTIFICATE OF CORRECTION

PATENT NO. : 5,867,347
DATED : February 2, 1999
INVENTOR(S) : Knight et al.

It is certified that error appears in the above-identified patent and that said Letters Patent is hereby corrected as shown below:

Column 18, line 33, delete "tacking" and insert therefor -- tracking--

Signed and Sealed this

Eighth Day of June, 1999

*Attest:*

Q. TODD DICKINSON

*Attesting Officer*     *Acting Commissioner of Patents and Trademarks*